(12) United States Patent
Aoyama et al.

(10) Patent No.: US 7,252,708 B2
(45) Date of Patent: Aug. 7, 2007

(54) FLUORESCENT WATER-BASE INK FOR INK-JET RECORDING

(75) Inventors: Michiko Aoyama, Nagoya (JP);
Masashi Tsuda, Aichi-ken (JP);
Hiromitsu Sago, Tokai (JP); Mayuko Umemura, Chiryu (JP); Hideto Yamazaki, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/948,312

(22) Filed: Sep. 24, 2004

(65) Prior Publication Data
US 2005/0120907 A1    Jun. 9, 2005

(30) Foreign Application Priority Data
Sep. 26, 2003    (JP) .............................. 2003-336086

(51) Int. Cl.
*C09D 11/02*    (2006.01)
(52) U.S. Cl. ................................. 106/31.32; 106/31.15
(58) Field of Classification Search ............. 106/31.15, 106/31.32
See application file for complete search history.

(56) References Cited

U.S. PATENT DOCUMENTS

| | | | | |
|---|---|---|---|---|
| 5,866,628 A | * | 2/1999 | Likavec et al. ............. 522/135 |
| 6,001,899 A | * | 12/1999 | Gundlach et al. ........... 523/160 |
| 6,054,505 A | * | 4/2000 | Gundlach et al. ........... 523/160 |
| 6,176,908 B1 | | 1/2001 | Bauer et al. | |
| 6,676,734 B2 | * | 1/2004 | Nagashima et al. ...... 106/31.32 |
| 6,835,239 B2 | * | 12/2004 | Hakamada et al. ........ 106/31.2 |
| 7,060,123 B2 | | 6/2006 | Hakamada et al. | |
| 2002/0047884 A1 | * | 4/2002 | Nagashima et al. ........ 347/100 |
| 2004/0231554 A1 | * | 11/2004 | Udagawa et al. ........ 106/31.15 |
| 2005/0052515 A1 | * | 3/2005 | Udagawa et al. ........... 347/100 |
| 2005/0061199 A1 | * | 3/2005 | Tsuda et al. .............. 106/31.15 |

FOREIGN PATENT DOCUMENTS

| | | |
|---|---|---|
| JP | 11-80632 A | 3/1999 |
| JP | A-11-209675 | 8/1999 |
| JP | A-2003-11332 | 4/2003 |
| JP | 2003-192962 A | 7/2003 |

* cited by examiner

*Primary Examiner*—C. Melissa Koslow
*Assistant Examiner*—Veronica Faison-Gee
(74) *Attorney, Agent, or Firm*—Oliff & Berridge, PLC (57) ABSTRACT

A fluorescent water base ink for ink-jet recording contains a first fluorescent dye and a second fluorescent dye. The first fluorescent dye has a first ultraviolet absorption wavelength region in an absorption spectrum and a first fluorescence emission wavelength region in a fluorescence spectrum. The second fluorescent dye has a second ultraviolet absorption wavelength region which is different from the first ultraviolet absorption wavelength region in an absorption spectrum and a second fluorescence emission wavelength region in a fluorescence spectrum. The first fluorescent dye further has an absorption wavelength region which is different from the first ultraviolet absorption wavelength region and which overlaps at least a part of the second fluorescence emission wavelength region.

8 Claims, 10 Drawing Sheets

FLUORESCENT WATER-BASE INK FOR INK-JET RECORDING

BACKGROUND OF THE INVENTION

1. Field of the Invention

The present invention relates to a fluorescent water base ink for ink-jet recording having a high fluorescence intensity.

2. Description of the Related Art

In the ink-jet recording system, the ink is discharged, for example, from the nozzles, the slits, or the porous film to perform the recording, for example, on the paper, the cloth, or the film. The system for discharging the ink includes, for example, the electrostatic attraction system in which the ink is discharged by utilizing the electrostatic attracting force, the drop-on-demand system in which the mechanical vibration or the displacement is applied to the ink by using the piezoelectric element, and the thermal ink-jet system in which bubbles are generated by heating the ink to utilize the pressure generated thereby. Ink droplets are formed by a variety of ink discharge systems to adhere a part or all of the ink droplets onto the recording objective material, and thus the recording is performed.

The development is advanced for the ink which is applicable in various fields by utilizing the ink-jet recording system as described above. In particular, the fluorescent ink has such a property that the light (exciting light) having a specified wavelength is absorbed, and the light (fluorescence) having a wavelength longer than that of the exciting light is emitted. Therefore, for example, the fluorescent ink is tried to be applied to such a way of use that any information, which requires the security, is recorded on a recording medium, and the information can be read by emitting the fluorescence by radiating the ultraviolet light as the exciting light. The fluorescent ink includes not only transparent inks which have no absorption in the visible region but also color inks which have the absorption in the visible region. In the case of the color fluorescent ink which has the absorption in the visible region, the information can be recognized visually even with the naked eye. The reading means can be selected depending on the contents of the information. Therefore, it is expected to widen the versatility of the ink.

However, in general, it is known for the fluorescent ink that the concentration quenching phenomenon occurs such that the fluorescence intensity is all the more decreased if the concentration of the fluorescent dye contained in the ink exceeds a certain amount, for the following reason. That is, the fluorescent dye undergoes the transition from the excited state to the more stable state without radiating the absorbed energy as the light due to the interaction of the excited fluorescent dye molecules (nonradiating process). Therefore, there has been such a problem that any fluorescent ink, which has a fluorescence intensity of not less than a certain degree, is not obtained even when the concentration of the fluorescent dye is adjusted at the best.

On the other hand, various trials have been made in order to enhance the fluorescence within a concentration range in which the concentration quenching phenomenon is not caused. For example, Japanese Patent Application Laid-open No. 2003-192962 discloses a fluorescent ink which uses, in combination, two types of fluorescent dyes which have a common absorption wavelength region in the ultraviolet region and which have a common fluorescence emission wavelength region in the visible region. When the two types of the fluorescent dyes are combined as described above, then the fluorescence intensity of the second fluorescent dye is added to the fluorescence intensity of the first fluorescent dye, and the ink having the high fluorescence intensity is obtained. However, actually, the fluorescence intensity of the fluorescent ink is smaller than the sum of the fluorescence intensities to be obtained when the two types of the fluorescent dyes are used singly respectively, probably for the following reason. That is, the first fluorescent dye and the second fluorescent dye have the common absorption wavelength region in the ultraviolet region. Therefore, it is considered that the excitation energy is shared by the first fluorescent dye and the second fluorescent dye, and each of the fluorescent dyes cannot emit the fluorescence sufficiently.

SUMMARY OF THE INVENTION

The present invention has been made in order to solve the problems as described above, an object of which is to provide a fluorescent water base ink for ink-jet recording having a high fluorescence intensity.

According to the present invention, there is provided a fluorescent water base ink for ink-jet recording comprising:

water;

a first fluorescent dye which has a first ultraviolet absorption wavelength region in an absorption spectrum and a first fluorescence emission wavelength region in a fluorescence spectrum; and a second fluorescent dye which has a second ultraviolet absorption wavelength region different from the first ultraviolet absorption wavelength region in an absorption spectrum and a second fluorescence emission wavelength region in a fluorescence spectrum, wherein:

the first fluorescent dye further has an absorption wavelength region which is different from the first ultraviolet absorption wavelength region and which overlaps at least a part of the second fluorescence emission wavelength region.

In the fluorescent water base ink for ink-jet recording of the present invention, the first ultraviolet absorption wavelength region of the first fluorescent dye is different from the second ultraviolet absorption wavelength region of the second fluorescent dye. Therefore, the light energy in the ultraviolet region can be effectively utilized without being shared by the first and second fluorescent dyes. Further, the first fluorescent dye has the absorption wavelength region which overlaps at least a part of the second fluorescence emission wavelength region of the second fluorescent dye. Therefore, the fluorescence, which is emitted by the second fluorescent dye, can be absorbed as the excitation energy by the first fluorescent dye. As a result, the total light energy, which excites the first fluorescent dye, is increased. Therefore, the fluorescence intensity obtained from the first fluorescent dye is amplified. The fact that the fluorescence emitted by the second fluorescent dye is absorbed as the excitation energy by the first fluorescent dye is confirmed from the fact that a peak intensity in the second fluorescence emission wavelength region, which is obtained when a fluorescence spectrum of the ink is measured, is lower than a peak intensity in the second fluorescence emission wavelength region which is obtained when a fluorescence spectrum of only the second fluorescent dye is measured.

In the ink of the present invention, the absorption wavelength region, which is possessed by the first fluorescent dye and which overlaps at least the part of the second fluorescence emission wavelength region, may exist in a visible region. Further, a peak wavelength of the first ultraviolet absorption wavelength region may be separated from a peak wavelength of the second ultraviolet absorption wavelength region by not less than 10 nm and especially by not less than 15 nm. Further, the first fluorescence emission wavelength region may exist in a visible region. C.I. Acid Red 52, C.I. Acid Yellow 73, or C.I. Solvent Red 49 may be used as the first fluorescent dye. A compound represented by the following chemical formula (1) may be used as the second fluorescent dye:

(1)

DESCRIPTION OF THE PREFERRED EMBODIMENTS

The fluorescent water base ink for ink-jet recording of the present invention contains the first fluorescent dye and the second fluorescent dye. The first fluorescent dye absorbs the light having the wavelength in the ultraviolet region (first ultraviolet absorption wavelength region) and the fluorescence having the predetermined wavelength region (second fluorescence emission wavelength region) emitted from the second fluorescent dye, and it emits the fluorescence at the predetermined wavelength having the predetermined wavelength region (first fluorescence emission wavelength region), for example, the visible wavelength region. As described above, when not only the light having the wavelength in the ultraviolet region but also the light having the wavelength of the fluorescence emitted from the second fluorescent dye is utilized as the exciting light, it is possible to obtain the ink which has the extremely high fluorescence intensity. In this specification, the light in the ultraviolet region means the light having wavelengths of 200 to 380 nm.

The fluorescence, which is emitted by the first fluorescent dye, may be the fluorescence having the wavelength within the visible region or the fluorescence having the wavelength outside of the visible region. When the first fluorescent dye emits the fluorescence having the wavelength in the visible region, then the emitted fluorescence can be read visually with the naked eye, and the fluorescence can be utilized to record various visible images and letters. On the other hand, when the first fluorescent dye emits the fluorescence having the wavelength outside of the visible region, it is possible to record invisible information which can be read only when any special reading instrument is used, which can be preferably usable, for example, in order to record information which requires the security.

The first fluorescent dye may be a color fluorescent dye which has an absorption wavelength region in the visible region, or a colorless fluorescent dye which has no absorption wavelength region in the visible region. When the first fluorescent dye is the color fluorescent dye which has the absorption wavelength region in the visible region, the versatility of the ink is widened, because information is recognizable even visually with the naked eye, and the ink can be utilized for the color recording. On the other hand, when the first fluorescent dye is the colorless fluorescent dye which has no absorption wavelength region in the visible region, the ink can be preferably used, for example, to record information which requires the security, because the information is not recognizable visually with the naked eye. When the fluorescence emission wavelength region and the absorption wavelength region of the first fluorescent dye are selected as described above, the fluorescent water base ink for ink-jet recording of the present invention can be preferably used for the way of use in the wide range.

The first fluorescent dye as described above is not specifically limited, including, for example, C.I. Acid Red 51, 52, 87, 92, 94; C.I. Acid Yellow 73; C.I. Direct Yellow 11, 24, 26, 87, 100, 132, 147; C.I. Direct Orange 26, 29, 29:1, 46; C.I. Direct Red 1, 13, 17, 239, 240, 242, 254; C.I. Basic Red 1, 2, 9, 12, 13, 14, 17; C.I. Basic Violet 1, 3, 7, 10, 11:1, 14; C.I. Solvent Yellow 82, 116; C.I. Solvent Red 43, 44, 45, 48, 49, 60, 72, 73; and C.I. Fluorescent 86, 87, 90, 113, 119, 166, 219, 220, 264, 271. For example, C.I. Acid Red 52 absorbs the light of 240 to 260 nm and 540 to 580 nm, and emits the fluorescence of 590 to 650 nm. C.I. Solvent Red 49 absorbs the light of 250 to 270 nm and 520 to 570 nm, and emits the fluorescence of 580 to 640 nm. C.I. Acid Yellow 73 absorbs the light of 230 to 240 nm and 470 to 500 nm, and emits the fluorescence of 400 to 450 nm and 500 to 600 nm.

It is preferable that the blending amount of the first fluorescent dye is 0.1 to 2.0% by weight in the fluorescent water base ink for ink-jet recording of the present invention. If the blending amount is less than 0.1% by weight, any sufficient fluorescence intensity is not obtained in some cases. If the blending amount exceeds 2.0% by weight, then the concentration quenching phenomenon occurs, and the fluorescence intensity is all the more decreased in some cases. More preferably, the blending amount is 0.2 to 1.0% by weight.

The second fluorescent dye is the fluorescent dye which absorbs the light at the wavelength different from the wavelength of the light absorbed by the first fluorescent dye in the ultraviolet region and which emits the fluorescence at the wavelength in the predetermined region. The first fluorescent dye is different from the second fluorescent dye in the absorption wavelength region in the ultraviolet region. Therefore, the light, which is given in the ultraviolet region, can be effectively used as the excitation energy by the respective fluorescent dyes without any overlap. The phrase "the first fluorescent dye is different from the second fluorescent dye in the absorption wavelength region in the ultraviolet region" means the fact that the peak wavelength in the ultraviolet absorption wavelength region of the first fluorescent dye is mutually separated from the peak wavelength in the ultraviolet absorption wavelength region of the second fluorescent dye by not less than 10 nm.

The optimum combination is selected for the second fluorescent dye while considering the absorption wavelength of the first fluorescent dye in the ultraviolet region and the other regions. That is, for example, when C.I. Acid Red 52 is used as the first fluorescent dye, the second fluorescent dye is selected such that the absorption wavelength of the second fluorescent dye in the ultraviolet region is in the region different from 240 to 260 nm as the ultraviolet absorption wavelength region of the first fluorescent dye, and the wavelength of the fluorescence emitted by absorbing the exciting light in the ultraviolet region is within the range of 540 to 580 nm as the absorption wavelength region of the first fluorescent dye. The second fluorescent dye as described above may include, for example, C.I. Acid Yellow 73, C.I. Acid Green 5, C.I. Solvent Yellow 82, 116, C.I. Solvent Green 7, C.I. Solvent Blue 5, and the fluorescent dye having the basic structure represented by the following chemical formula (1).

(1)

The following other combination is also available. For example, C.I. Solvent Red 49 absorbs the light of 250 to 270 nm and 520 to 570 nm, and it emits the fluorescence of 580 to 640 nm. On the other hand, C.I. Acid Yellow 73 absorbs the light of 230 to 240 nm and 470 to 500 nm, and it emits the fluorescence of 400 to 450 nm and 500 to 600 nm. Therefore, when C.I. Solvent Red 49 as the first fluorescent dye and C.I. Acid Yellow 73 as the second fluorescent dye are used in combination, the respective dyes absorb the exciting light without any overlap in the ultraviolet region to emit the fluorescence, while the fluorescence of 500 to 600 nm, which is emitted by C.I. Acid Yellow 73, is utilized as the exciting light for the C.I. Solvent Red 49. As a result, the fluorescence is observed, which has the extremely high fluorescence intensity of 580 to 640 nm resulting from C.I. Solvent Red 49.

The blending amount of the second fluorescent dye is preferably 0.1 to 5.0% by weight in the fluorescent water base ink for ink-jet recording of the present invention. If the blending amount is less than 0.1% by weight, then the effect to amplify the fluorescence intensity caused by the second fluorescent dye is not obtained, and any sufficient fluorescence intensity is not obtained in some cases. If the blending amount exceeds 5.0% by weight, then the solid content is increased in the ink, and the stability of the ink is harmfully affected thereby in some cases. More preferably, the blending amount is 0.2 to 3.0% by weight. In view of the function in which the fluorescence of the second fluorescent dye amplifies the fluorescence of the first fluorescent dye as described above, it is desirable that the second fluorescent dye is at a molar ratio of 0.5 to 4 with respect to the first fluorescent dye.

The fluorescent water base ink for ink-jet recording of the present invention contains water. Those having high purities such as ion exchange water and distilled water other than ordinary water are preferably usable for the water. The content of water in the fluorescent water base ink for ink-jet recording of the present invention depends on, for example, the desired characteristics of the ink and the types and the compositions of the first fluorescent dye and the second fluorescent dye. However, the content of water is preferably 10.0 to 95.0% by weight. If the content of water is less than 10.0% by weight, the ratio of components other than water is necessarily increased. Therefore, when the printing is performed on the paper, then the ink blurs in some cases, and/or the viscosity is increased in other cases. For this reason, the ink is hardly introduced into the nozzles occasionally. If the content of water exceeds 95.0% by weight, then the viscosity of the ink is excessively increased after the volatile components are evaporated, and any discharge failure is caused in some cases. More preferably, the content of water is 30.0 to 90.0% by weight.

The fluorescent water base ink for ink-jet recording of the present invention is basically constructed as described above. However, the ink may further contain conventionally known various moistening agents, permeating agents, surfactants, viscosity-adjusting agents, surface tension-adjusting agents, pH-adjusting agents, metal rustproofing agents, specific resistance-adjusting agents, film-forming agents, ultraviolet-absorbing agents, antioxidants, antifading agents, and antiseptic/fungicidal agents depending on the purpose to improve various performances such as the discharge stability, the adaptability to the materials for the head and the ink cartridge, the storage stability, the image storage performance and so on. When the fluorescent water base ink for ink-jet recording of the present invention is applied to the ink-jet system in which the ink is jetted in accordance with the action of the thermal energy, it is also allowable to adjust thermal physical property values such as the specific heat, the coefficient of thermal expansion, and the coefficient of thermal conductivity.

The present invention will be explained in further detail below as exemplified by Examples. However, the present invention is not limited to only Examples.

EXAMPLES 1 TO 5

Materials having respective compositions shown in Table 1 were subjected to agitation, followed by being filtrated through a membrane filter of 0.8 μm to prepare fluorescent water base inks.

COMPARATIVE EXAMPLES 1 TO 9

Materials having respective compositions shown in Table 2 were subjected to agitation, followed by being filtrated through a membrane filter of 0.8 μm to prepare fluorescent water base inks. The fluorescent dye having the chemical formula (2) in Table 2 indicates the dye having the following chemical formula (2).

(2)

Measurement of Absorption Spectrum

Figure 1:
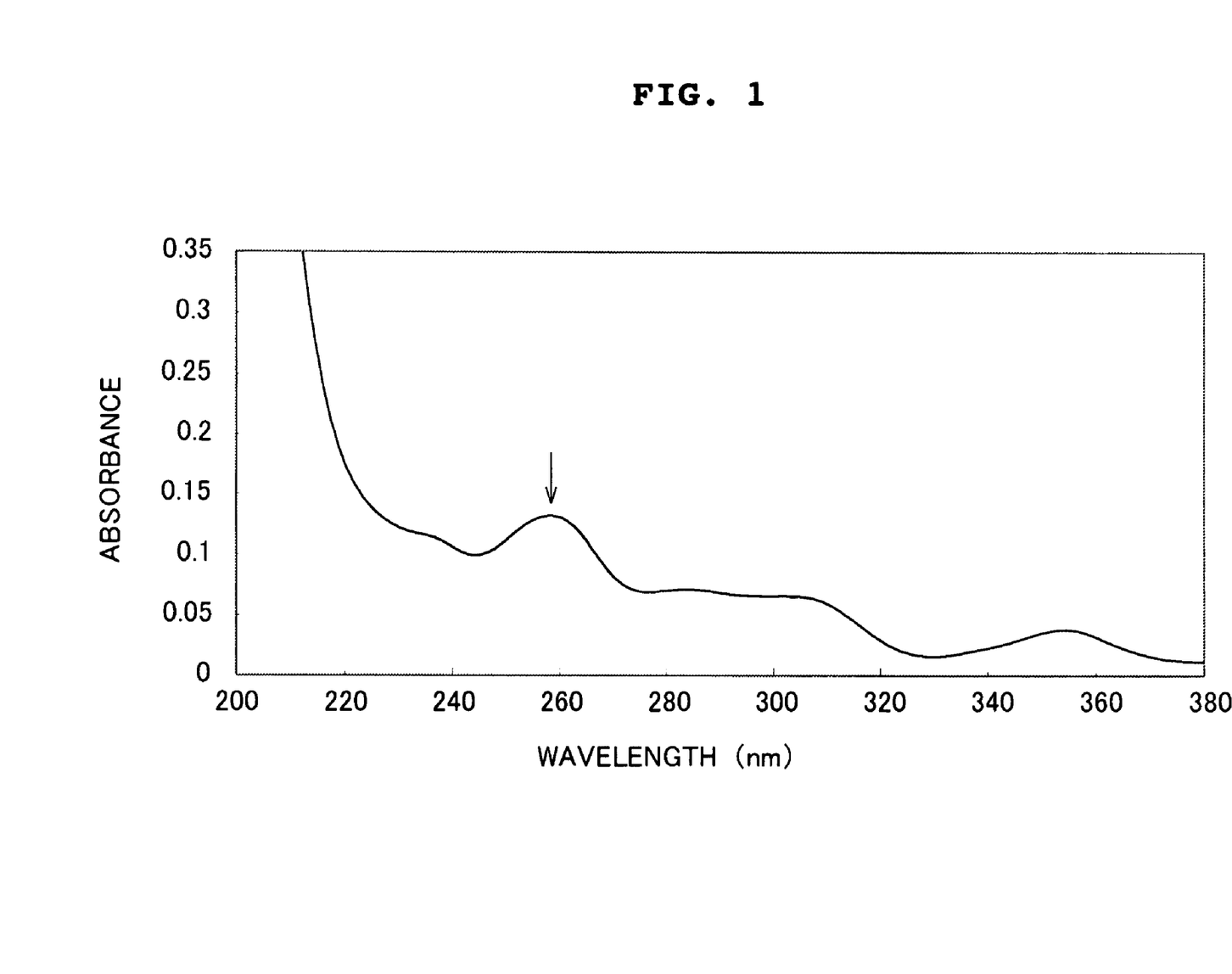
FIG. 1 shows an absorption spectrum in the ultraviolet region of C.I. Solvent Red 49.
Figure 2:
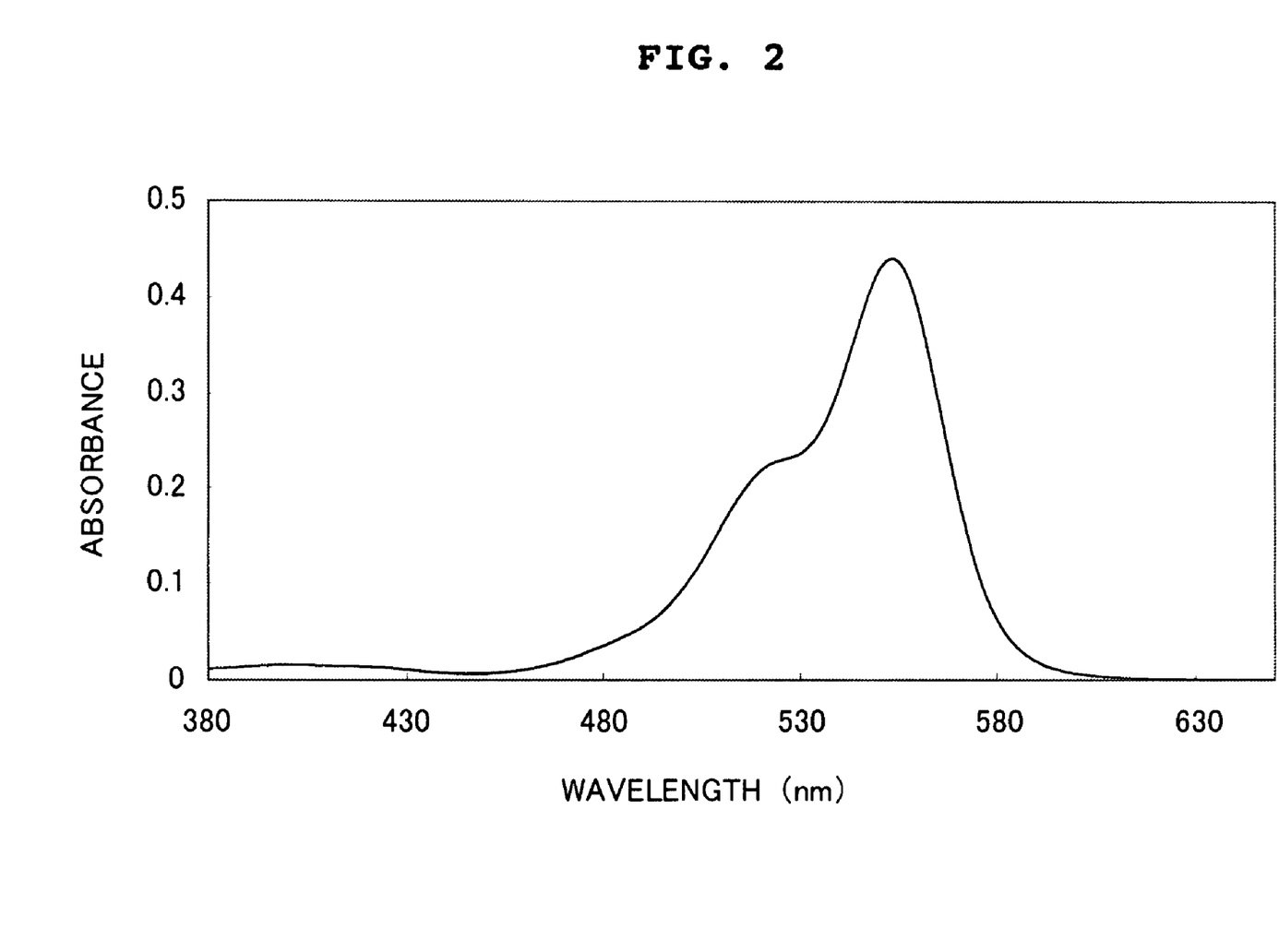
FIG. 2 shows an absorption spectrum in the visible region of C.I. Solvent Red 49.
Figure 3:
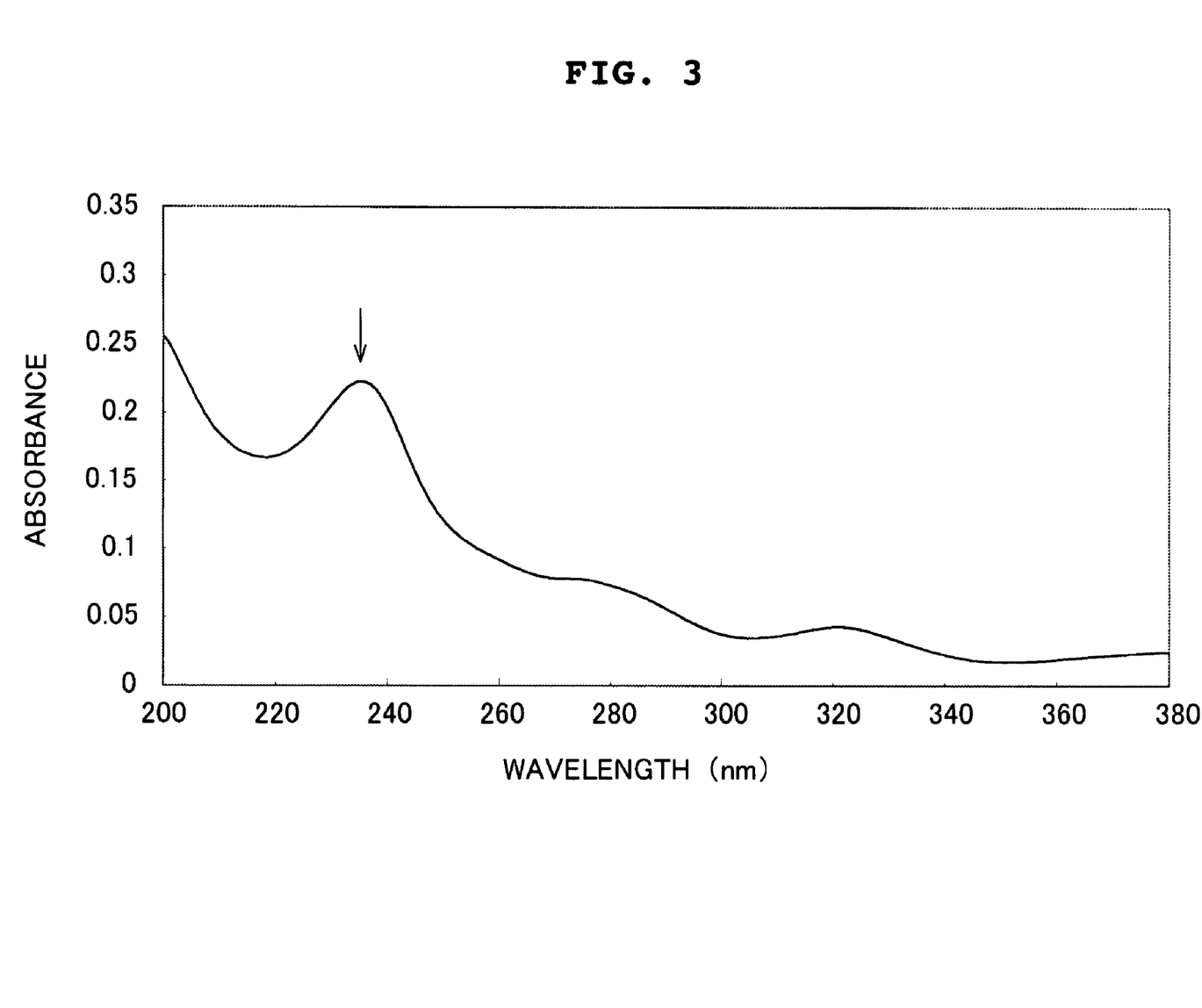
FIG. 3 shows an absorption spectrum in the ultraviolet region of C.I. Acid Yellow 73.
Figure 4:
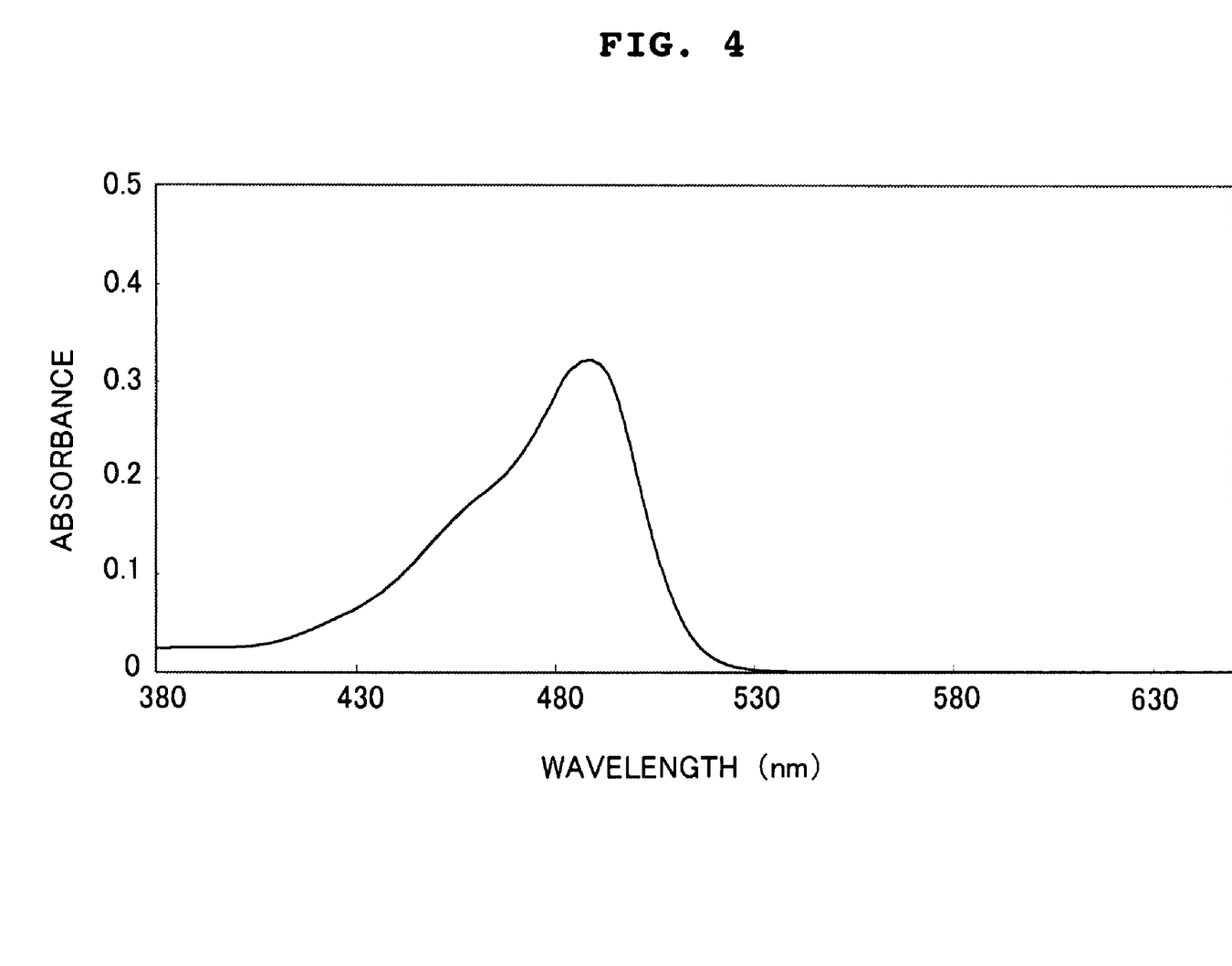
FIG. 4 shows an absorption spectrum in the visible region of C.I. Acid Yellow 73.

The absorption spectrum of each of the fluorescent dyes added to the inks of Examples 1 to 5 and Comparative Examples 1 to 9 was measured by using an ultraviolet-visible spectrophotometer (UV-3100PC produced by Shimadzu Corporation). FIGS. 1 and 2 show absorption spectrums in the ultraviolet region and the visible region of C.I. Solvent Red 49 as examples of the absorption spectrum. FIGS. 3 and 4 show absorption spectrums in the ultraviolet region and the visible region of C.I. Acid Yellow 73. As appreciated from the ultraviolet absorption spectrum of C.I. Solvent Red 49 shown in FIG. 1, the wavelength (in the vicinity of 258 nm shown by the arrow in the drawing), at which the absorption is locally maximized in the ultraviolet region, is the ultraviolet absorption peak wavelength of C.I. Solvent Red 49. As appreciated from the ultraviolet absorption spectrum of C.I. Acid Yellow 73 shown in FIG. 3, the wavelength (in the vicinity of 238 nm shown by the arrow in the drawing), at which the absorption is locally maximized in the ultraviolet region, is the ultraviolet absorption peak wavelength of C.I. Acid Yellow 73. A plurality of wavelengths, at which the absorption is locally maximized, are present in the ultraviolet region. However, the peak wavelength is the wavelength at which the absorbance is the largest, of the plurality of wavelengths at which the absorption is locally maximized. According to the spectrums, it is understood that the ultraviolet absorption peak position of C.I. Solvent Red 49 is mutually separated from that of C.I. Acid Yellow 73 by not less than 10 nm, especially by not less than 15 nm. The peak positions were also determined from the absorption spectrums for the other fluorescent dyes used in Examples 2 to 4 and Comparative Examples 1 to 9. The absorption wavelength region shown in Tables 1 and 2 was read from the absorption band in the absorption spectrum.

Measurement of Fluorescence Spectrum

The printing was performed on the regular paper (XEROX 4200 produced by Fuji Xerox) by using an ink-jet printer (MFC-5100J produced by Brother Industries, Ltd.) with the inks prepared in Examples 1 to 5 and Comparative Examples 1 to 9. A portion, on which the covering ratio was 100%, was used as a recording sample. The fluorescence spectrum was observed by using a fluorescence spectrophotometer (F-4500 produced by Hitachi) to obtain the fluorescence intensity of the recording sample. When the fluorescence spectrum was measured, then the fluorescence intensity was measured between fluorescence wavelengths of 400 and 650 nm while changing the wavelength of the exciting light source between 200 and 380 nm, and thus a three-dimensional fluorescence spectrum was obtained.

Figure 5:
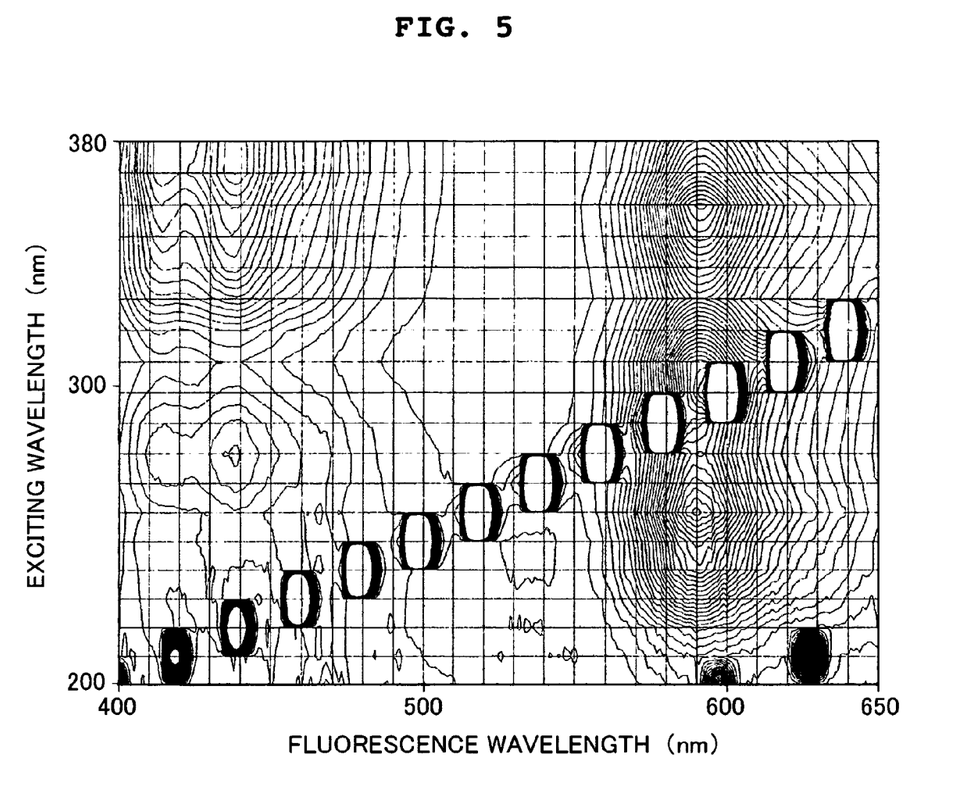
FIG. 5 shows a three-dimensional fluorescence spectrum of an ink of Example 1.
Figure 6:
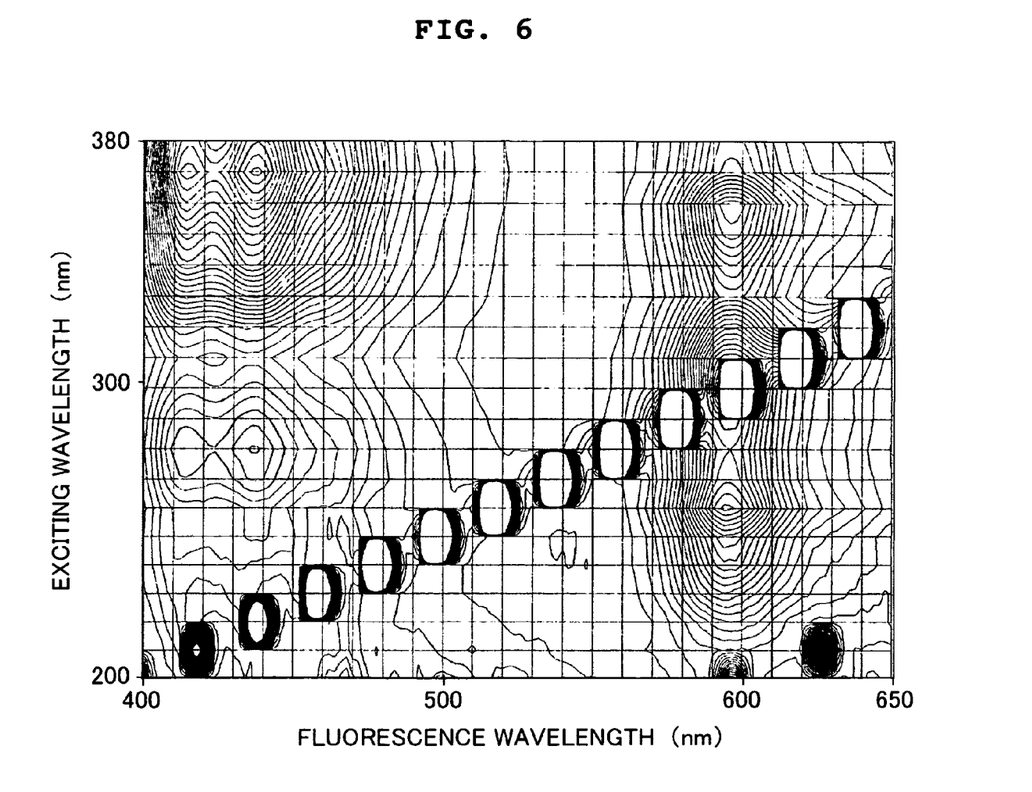
FIG. 6 shows a three-dimensional fluorescence spectrum of an ink containing only C.I. Solvent Red 49.
Figure 7:
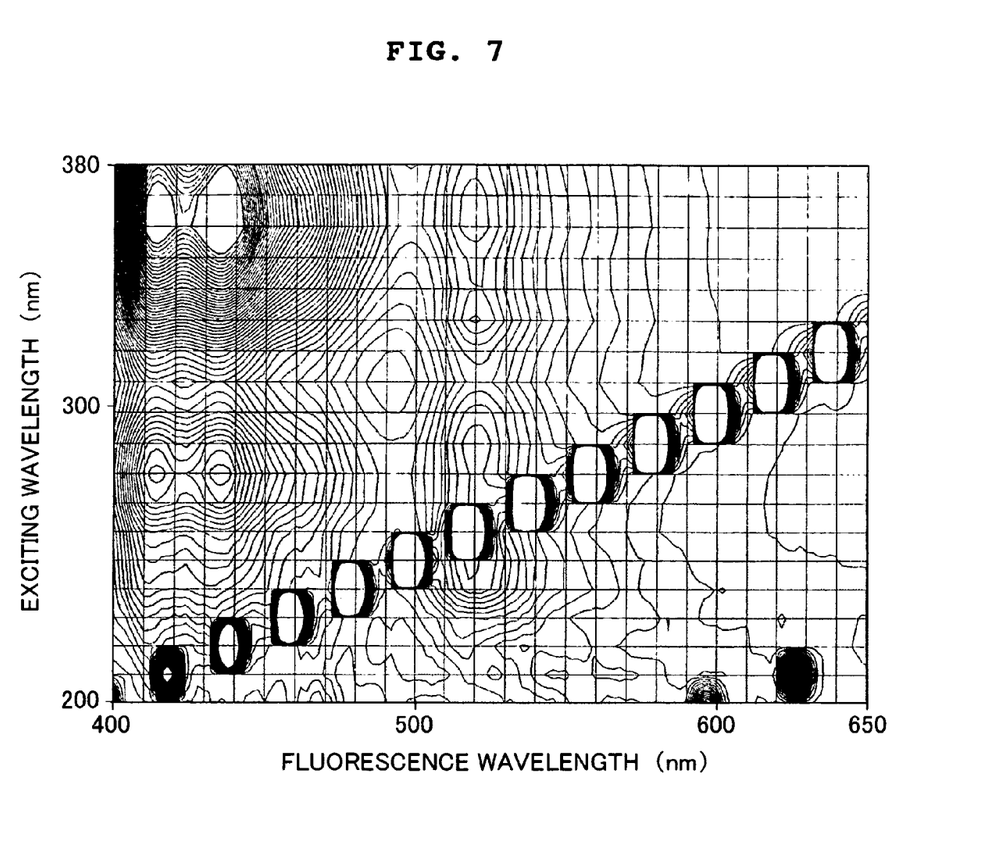
FIG. 7 shows a three-dimensional fluorescence spectrum of an ink containing only C.I. Acid Yellow 73.

FIG. 5 shows the three-dimensional fluorescence spectrum of the ink of Example 1. In the three-dimensional fluorescence spectrum shown in FIG. 5, the vertical axis indicates the wavelength (nm) of the exciting light, and the horizontal axis indicates the fluorescence wavelength (nm), wherein the fluorescence intensity is indicated by contour lines. In the drawing, rectangular patterns in an array, in which both of the fluorescence and the exciting light are shifted toward the long wavelength side, result from the exciting light and the secondary light thereof. The ink of Example 1 contains C.I. Solvent Red 49 and C.I. Acid Yellow 73 in the ink. However, in order to investigate the influence of the fluorescent dyes on the fluorescence intensity, an ink containing only C.I. Solvent Red 49 and an ink containing only C.I. Acid Yellow 73 were prepared in the same manner as described above, with which the recording was performed under the same condition as that described above. After that, the three-dimensional fluorescence spectrums were measured therefor respectively. In the ink containing only C.I. Solvent Red 49, the % by weights of C.I. Solvent Red 49, glycerol, and butyltriglycol are the same as the % by weights of the respective components of the ink of Example 1. Further, in the ink containing only C.I. Acid Yellow 73, the % by weights of C.I. Acid Yellow 73, glycerol, and butyltriglycol are the same as the % by weights of the respective components of the ink of Example 1. FIGS. 6 and 7 show the three-dimensional fluorescence spectrums of the ink containing only C.I. Solvent Red 49 and the ink containing only C.I. Acid Yellow 73 respectively. When FIGS. 5, 6, and 7 are compared with each other, it is understand that the fluorescence band, which appears at 500 to 600 nm when only C.I. Acid Yellow 73 is contained as shown in FIG. 7, disappears when both of C.I. Solvent Red 49 and C.I. Acid Yellow 73 are contained (Example 1). Further, it is understand that the intensity of the fluorescence band which appears at 580 to 640 nm when only C.I. Solvent Red 49 is contained as shown in FIG. 6 appears more strongly when both of C.I. Solvent Red 49 and C.I. Acid Yellow 73 are contained (Example 1).

Figure 8:
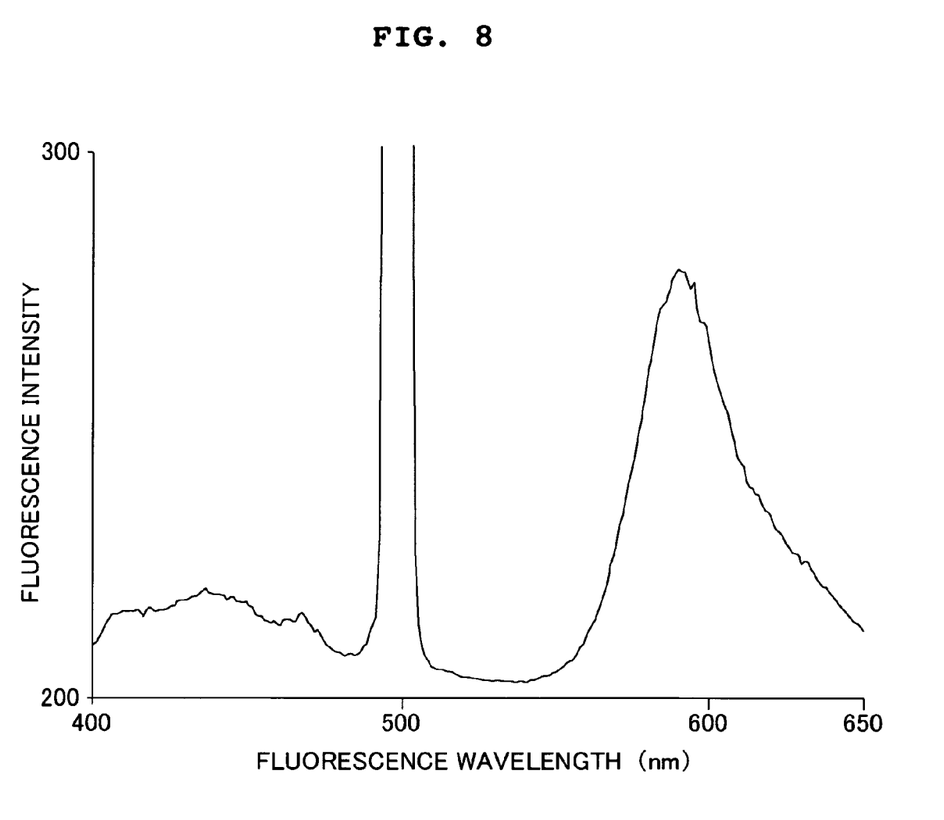
FIG. 8 shows a fluorescence spectrum of the ink of Example 1 at an exciting wavelength of 254 nm.
Figure 9:
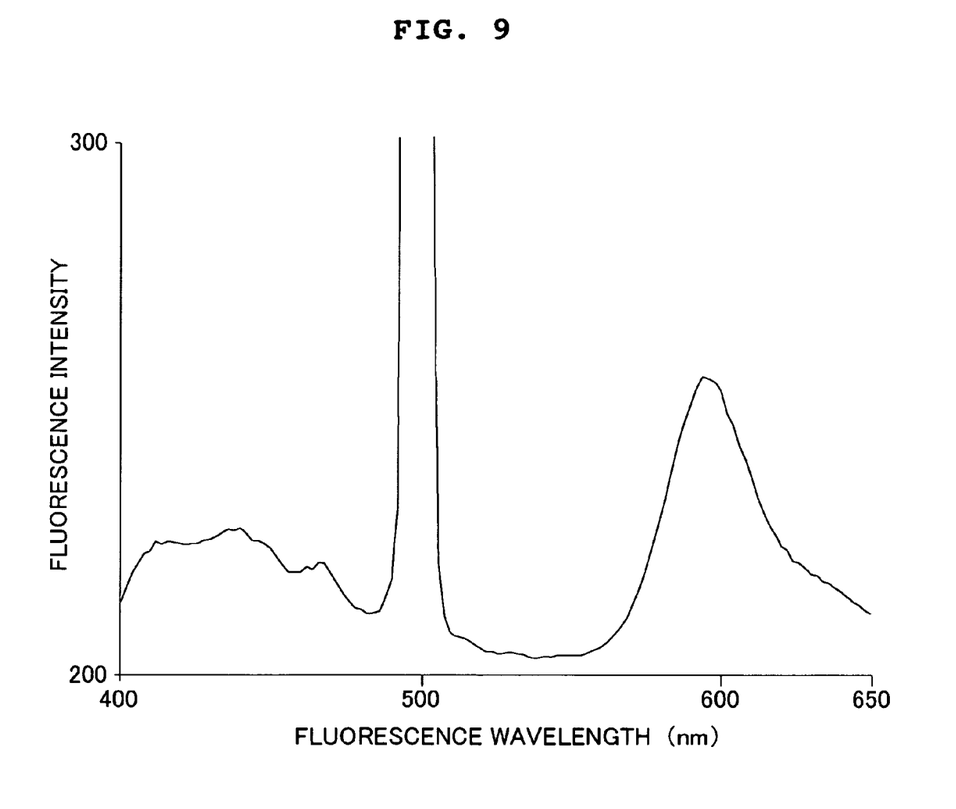
FIG. 9 shows a fluorescence spectrum of the ink containing only C.I. Solvent Red 49 at an exciting wavelength of 254 nm.
Figure 10:
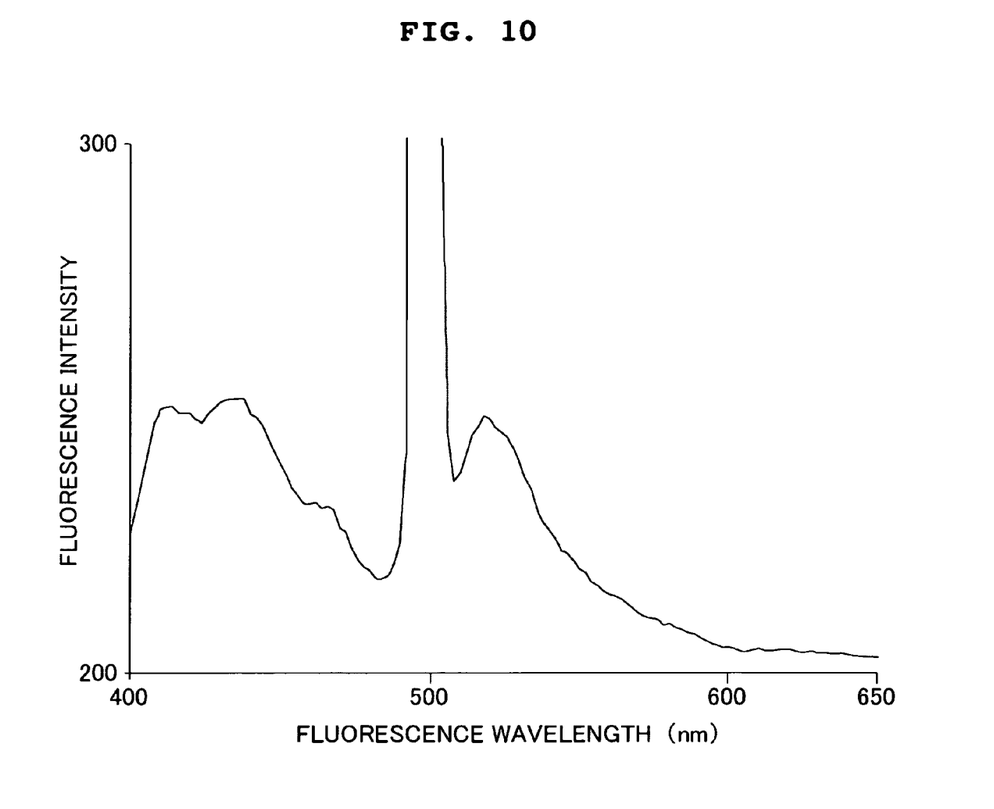
FIG. 10 shows a fluorescence spectrum of the ink containing only C.I. Acid Yellow 73 at an exciting wavelength of 254 nm.

In order to more comprehensively understand the results of FIGS. 5 to 7, the three-dimensional fluorescence spectrums in FIGS. 5 to 7 are sliced along the horizontal axis on condition that the wavelength of the exciting light source is 254 nm to provide two-dimensional fluorescence spectrums in FIGS. 8 to 10 each of which represents the fluorescence intensity (vertical axis) with respect to the fluorescence wavelength (horizontal axis) thereby. It is understood that the fluorescence band of 500 to 600 nm shown in FIG. 10, which is characteristic of C.I. Acid Yellow 73, completely disappears in the fluorescence spectrum shown in FIG. 8 for the ink (Example 1) containing C.I. Solvent Red 49 and C.I. Acid Yellow 73. The intensity of the characteristic fluorescence band which appears at 580 to 640 nm in the fluorescence spectrum shown in FIG. 8 is increased as compared with the intensity of the fluorescence band at 580 to 640 nm obtained when only C.I. Solvent Red 49 is contained as shown in FIG. 9. According to this fact, it is considered that the fluorescence at 500 to 600 nm, which is emitted by C.I. Acid Yellow 73, is absorbed by Solvent Red 49 which has the absorption characteristic as shown in FIG. 2, and thus C.I. Solvent Red 49 has successfully emitted the more intense fluorescence. As for each of the inks prepared in Examples 2 to 5 and Comparative Examples 1 to 9, the two-dimensional fluorescence spectrum was determined by processing the three-dimensional fluorescence spectrum thereof in the same manner as described above. The fluorescence band was read from the determined two-dimensional fluorescence spectrum, which is shown as the fluorescence wavelength region in Tables 1 and 2.

EVALUATION

The peak intensity was obtained from the fluorescence spectrum measured as described above for each of the inks of Examples 1 to 5 and Comparative Examples 1 to 9. The fluorescence intensity was judged from the obtained peak intensity in accordance with the following criteria. The peak intensity is the peak intensity of the fluorescence obtained when the wavelength of the exciting light is 254 nm. In the following criteria, the fluorescence intensity of not less than 250 is the fluorescence intensity which is sufficient when the recognition is made visually with the naked eye. The fluorescence intensity of not less than 300 is the fluorescence intensity which is extremely excellent when the recognition is made visually with the naked eye.

++: the fluorescence intensity is not less than 300;

+: the fluorescence intensity is not less than 250 and less than 300;

±: the fluorescence intensity is not less than 200 and less than 250;

−: the fluorescence intensity is less than 200.

Results are shown in Tables 1 and 2. As understood from Tables 1 and 2, it is appreciated that the inks, which are based on the use of the combinations of the fluorescent dyes according to the present invention, are excellent in the fluorescence intensity. In particular, it is understood that the fluorescence intensity is extremely increased when the fluorescent dye having the chemical formula (1) is used.

According to the present invention, it is possible to provide the fluorescent water base ink for ink-jet recording having the high fluorescence intensity.

TABLE 1

| Ink composition (% by weight) | | Absorption wavelength region (nm) | Fluorescence emission wavelength region (nm) | Ex. 1 | Ex. 2 | Ex. 3 | Ex. 4 | Ex. 5 |
|---|---|---|---|---|---|---|---|---|
| First fluorescent dye | C. I. Acid Red 52 | Ultraviolet: 240–260 Visible: 540–580 | 590–650 | — | 0.3 | 0.3 | — | — |
| | C. I. Solvent Red 49 | Ultraviolet: 250–270 Visible: 520–570 | 580–640 | 0.3 | — | — | 0.5 | — |
| | C. I. Acid Yellow 73 | Ultraviolet: 230–240 Visible: 470–500 | 400–450 500–600 | — | — | — | — | 0.2 |
| Second fluorescent dye | C. I. Acid Yellow 73 | Ultraviolet: 230–240 Visible: 470–500 | 400–450 500–600 | 0.2 | — | — | — | — |
| | C. I. Acid Green 5 | Ultraviolet: 220–240 Visible: 270–300 | 420–450 490–570 | — | 0.2 | — | — | — |
| | Fluorescent dye of chemical formula (1) | Ultraviolet: 220–240 | 400–600 | — | — | 1.0 | 1.0 | 1.0 |
| | Moistening agent (glycerol) | — | — | 25.0 | 25.0 | 25.0 | 25.0 | 25.0 |
| | Permeating agent (butyltriglycol) | — | — | 5.0 | 5.0 | 5.0 | 5.0 | 5.0 |
| | Pure water | — | — | 69.5 | 69.5 | 68.7 | 68.5 | 68.8 |
| | Fluorescence intensity | — | — | 250 | 260 | 330 | 350 | 300 |
| | Evaluation | — | — | + | + | ++ | ++ | ++ |

TABLE 2

| Ink composition (% by weight) | | Absorption wavelength region (nm) | Fluorescence emission wavelength region (nm) | Comp. Ex. 1 | Comp. Ex. 2 | Comp. Ex. 3 | Comp. Ex. 4 | Comp. Ex. 5 |
|---|---|---|---|---|---|---|---|---|
| First fluorescent dye | C. I. Acid Red 52 | Ultraviolet: 240–260 Visible: 540–580 | 590–650 | 0.3 | — | — | — | 0.3 |
| | C. I. Solvent Red 49 | Ultraviolet: 250–270 Visible: 520–570 | 580–640 | — | 0.5 | — | — | — |
| | C. I. Acid Yellow 73 | Ultraviolet: 230–240 Visible: 470–500 | 400–450 500–600 | — | — | 0.2 | 0.2 | — |
| | C. I. Acid Green 5 | Ultraviolet: 220–240 | 420–450 | — | — | — | — | — |

TABLE 2-continued

| Ink composition (% by weight) | | Absorption wavelength region (nm) | Fluorescence emission wavelength region (nm) | | | | | |
|---|---|---|---|---|---|---|---|---|
| Second fluorescent dye | C. I. Acid Green 5 | Visible: 270–300<br>Ultraviolet: 220–240<br>Visible: 270–300 | 490–570<br>420–450<br>490–570 | — | — | — | 0.2 | — |
| | C. I. Solvent Red 49 | Ultraviolet: 250–270<br>Visible: 520–570 | 580–640 | — | — | — | — | — |
| | Fluorescent dye of chemical formula (2) | Ultraviolet: 250–270 | 420–500 | — | — | — | — | 1.0 |
| Moistening agent (glycerol) | | — | — | 25.0 | 25.0 | 25.0 | 25.0 | 25.0 |
| Permeating agent (butyltriglycol) | | — | — | 5.0 | 5.0 | 5.0 | 5.0 | 5.0 |
| Pure water | | — | — | 69.7 | 69.5 | 69.8 | 69.6 | 68.7 |
| Fluorescence intensity | | — | — | 220 | 240 | 160 | 150 | 120 |
| Evaluation | | — | — | ± | ± | − | − | − |

| Ink composition (% by weight) | | Absorption wavelength region (nm) | Fluorescence emission wavelength region (nm) | Comp. Ex. 6 | Comp. Ex. 7 | Comp. Ex. 8 | Comp. Ex. 9 |
|---|---|---|---|---|---|---|---|
| First fluorescent dye | C. I. Acid Red 52 | Ultraviolet: 240–260<br>Visible: 540–580 | 590–650 | — | 0.3 | — | — |
| | C. I. Solvent Red 49 | Ultraviolet: 250–270<br>Visible: 520–570 | 580–640 | 0.5 | — | — | — |
| | C. I. Acid Yellow 73 | Ultraviolet: 230–240<br>Visible: 470–500 | 400–450<br>500–600 | — | — | — | — |
| | C. I. Acid Green 5 | Ultraviolet: 220–240<br>Visible: 270–300 | 420–450<br>490–570 | — | — | 0.2 | 0.2 |
| Second fluorescent dye | C. I. Acid Green 5 | Ultraviolet: 220–240<br>Visible: 270–300 | 420–450<br>490–570 | — | — | — | — |
| | C. I. Solvent Red 49 | Ultraviolet: 250–270<br>Visible: 520–570 | 580–640 | — | 0.5 | — | — |
| | Fluorescent dye of chemical formula (2) | Ultraviolet: 250–270 | 420–500 | 1.0 | — | — | 1.0 |
| Moistening agent (glycerol) | | — | — | 25.0 | 25.0 | 25.0 | 25.0 |
| Permeating agent (butyltriglycol) | | — | — | 5.0 | 5.0 | 5.0 | 5.0 |
| Pure water | | — | — | 68.5 | 69.2 | 69.8 | 68.8 |
| Fluorescence intensity | | — | — | 140 | 150 | 200 | 110 |
| Evaluation | | — | — | − | − | ± | − |

What is claimed is:

1. A fluorescent water base ink for ink-jet recording, comprising:
   water; and
   a fluorescent dye consisting of a first fluorescent dye and a second fluorescent dye;
   wherein:
   the first fluorescent dye has a first absorption spectrum and a first fluorescence spectrum;
   the second fluorescent dye has a second absorption spectrum and a second fluorescence spectrum;
   the first absorption spectrum comprises a first ultraviolet absorption wavelength region and an additional absorption wavelength region;
   the first fluorescence spectrum comprises a first fluorescence emission wavelength region;
   the second absorption spectrum comprises a second ultraviolet absorption wavelength region;
   the second fluorescence spectrum comprises a second fluorescence emission wavelength region;
   the first ultraviolet absorption wavelength region is different from the second ultraviolet absorption wavelength region; and
   the additional absorption wavelength region overlaps at least a part of the second fluorescence emission wavelength region.

2. The fluorescent water-based ink for ink-jet recording according to claim 1, wherein:
   the fluorescent water-based ink has a first peak intensity in the second fluorescence emission wavelength region when the second fluorescent dye is present in a predetermined concentration;
   a second fluorescent water-based ink that comprises the second fluorescent dye in the predetermined concentration and that is free from the first fluorescent dye has a second peak intensity in the second fluorescence emission wavelength region; and
   the first peak intensity is lower than the second peak intensity.

3. The fluorescent water-based ink for ink-jet recording according to claim 1, wherein light emitted by the second fluorescent dye can be used as excitation energy to cause the first fluorescent dye to emit light.

4. The fluorescent water-based ink for ink-jet recording according to claim 1, wherein the additional absorption wavelength region comprises visible wavelengths.

5. The fluorescent water-based ink for ink-jet recording according to claim 1, wherein:
   the first ultraviolet absorption spectrum region comprises a first peak wavelength and the second ultraviolet absorption wavelength region comprises a second peak wavelength; and the first peak wavelength is separated from the second peak wavelength by at least 10 nm.

6. The fluorescent water-based ink for ink-jet recording according to claim 1, wherein the first fluorescence emission wavelength region comprises visible wavelengths.

7. The fluorescent water-based ink for ink-jet recording according to claim 1, wherein the first fluorescent dye is selected from the group consisting of C.I. Acid Red 52, C.I. Acid Yellow 73, and C.I. Solvent Red 49.

8. The fluorescent water-based ink for ink-jet recording according to claim 7, wherein the second fluorescent dye comprises a compound represented by the following chemical formula (1):

(1)

* * * * *